(12) United States Patent
Ackerman

(10) Patent No.: US 8,202,051 B2
(45) Date of Patent: Jun. 19, 2012

(54) TURBINE APPARATUS

(76) Inventor: Ronald Paul Ackerman, Coon Rapids, MN (US)

(*) Notice: Subject to any disclaimer, the term of this patent is extended or adjusted under 35 U.S.C. 154(b) by 613 days.

(21) Appl. No.: 12/364,676

(22) Filed: Feb. 3, 2009

(65) Prior Publication Data

US 2010/0196157 A1    Aug. 5, 2010

(51) Int. Cl.
*F03D 7/02* (2006.01)

(52) U.S. Cl. ............................................. 416/13; 416/41

(58) Field of Classification Search .................. 416/13, 416/198 R, 199, 200 A, 201 A, 198 A, 9, 416/10, 41; 415/4.1, 4.2, 4.3; 290/44, 55
See application file for complete search history.

(56) References Cited

U.S. PATENT DOCUMENTS

| | | | |
|---|---|---|---|
| 198,302 A * | 12/1877 | Kimball | 416/13 |
| 1,009,896 A * | 11/1911 | Chaddick | 416/13 |
| 4,427,343 A | 1/1984 | Fosdick | |
| 4,877,374 A * | 10/1989 | Burkett | 416/136 |
| 6,331,100 B1 | 12/2001 | Liu | |
| 7,063,501 B2 | 6/2006 | Selsam | |
| 7,323,792 B2 | 1/2008 | Sohn | |

* cited by examiner

*Primary Examiner* — Thomas L Dickey
*Assistant Examiner* — Nikolay Yushin
(74) *Attorney, Agent, or Firm* — Roger Belfay

(57) ABSTRACT

The wind-driven turbine apparatus is an apparatus comprising: a horizontal axle, a support frame, said support frame comprising; bearings configured to support said horizontal axle; and a central bearing to permit said support frame to rotate about a vertical axis; a plurality of axial blades, spaced longitudinally along said horizontal axle, spaced radially around said horizontal axle and a tail attached to said support frame.

4 Claims, 3 Drawing Sheets

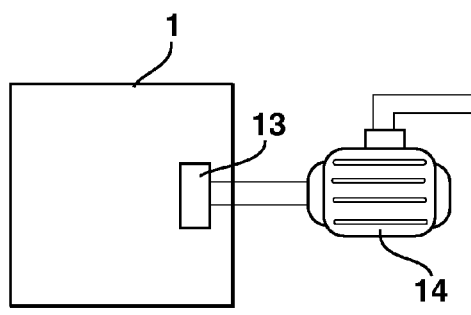
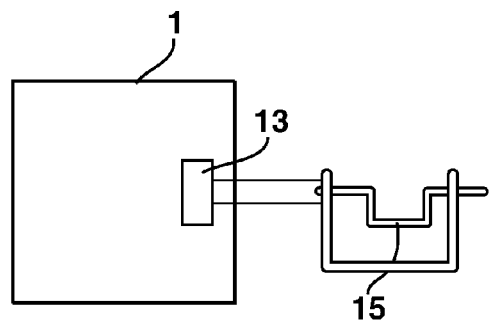
FIG. 4          FIG. 5
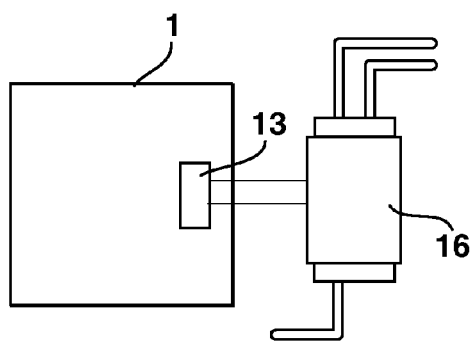
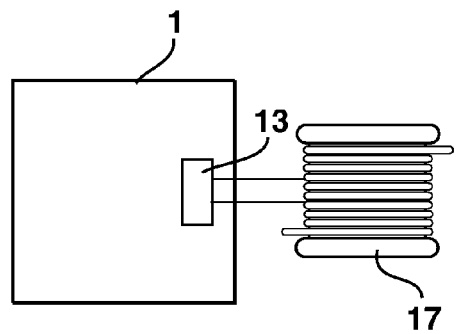
FIG. 6          FIG. 7

TURBINE APPARATUS

The wind-driven turbine apparatus for collecting and using wind energy is an apparatus comprising: a horizontal axle; a support frame, said support frame comprising; bearings configured to support said horizontal axle; and a central bearing to permit said support frame to rotate about a vertical axis; a plurality of axial blades, spaced longitudinally along said horizontal axle, spaced radially around said horizontal axle in a manner to establish balanced rotation, and disposed along said horizontal axle between said plurality of bearings; and a tail attached to said support frame, and set at an angle to said horizontal axle.

CROSS REFERENCE TO RELATED APPLICATIONS

There are no applications related to this application.

STATEMENT REGARDING FEDERAL SPONSORSHIP

No invention claimed in this application was made under Federally sponsored research or development.

BACKGROUND OF INVENTION

Obtaining the maximum amount of energy from wind or other moving fluids is an engineering problem of long standing. Solutions to this problem fall into several broad classes.

One such class is provision of Blades or airfoils which move parallel to their axis of rotation. The utility patent application by Burg (Published Patent Application No. 20070269306) is exemplary of this class.

Another such class is provision of a single mounting point for an axle to permit directional change of the blades corresponding to wind direction. The utility patents to Selsam (U.S. Pat. No. 7,063,501), and Sohn (U.S. Pat. No. 7,323,792B2) are exemplary of this class.

Another such class is provision of multiple rows of blades, but without means to orient to the wind. The utility patent to Fosdick (U.S. Pat. No. 4,427,343A) is exemplary of this class.

The present invention provides a wind turbine which provides blades oriented along an extended axis, self orientation to an incident wind, and the ability to enhance performance by providing a wind directing stationary (relative to the blades) airfoil.

BRIEF SUMMARY OF THE INVENTION

The wind-driven turbine apparatus for collecting and using wind energy is an apparatus comprising: a horizontal axle; a support frame, said support frame comprising; bearings configured to support said horizontal axle; and a central bearing to permit said support frame to rotate about a vertical axis; a plurality of axial blades, spaced longitudinally along said horizontal axle, spaced radially around said horizontal axle in a manner to establish balanced rotation, and disposed along said horizontal axle between said plurality of bearings; and a tail attached to said support frame, and set at an angle to said horizontal axle.

The blades of the wind-driven turbine apparatus may be curved with one or more of the blades having a hooked tip.

Suitable energy conversion means may be attached to the horizontal axle to convert the energy of rotation into mechanical or electrical form for whatever use the user may make of the energy. Such energy conversion means include, but are not limited to electrical generators, cranks, pumps, and spools.

The support frame may further comprise a foil mounted to the windward side of the blade and horizontal axle assembly.

BRIEF DESCRIPTION OF THE DRAWINGS

FIG. 4 is a schematic view of the invention activating an electrical generator.

FIG. 5 is a schematic view of the invention activating a crank.

FIG. 6 is a schematic view of the invention activating a pump.

FIG. 7 is a schematic view of the invention activating a spool.

DETAILED DESCRIPTION

Figure 1:
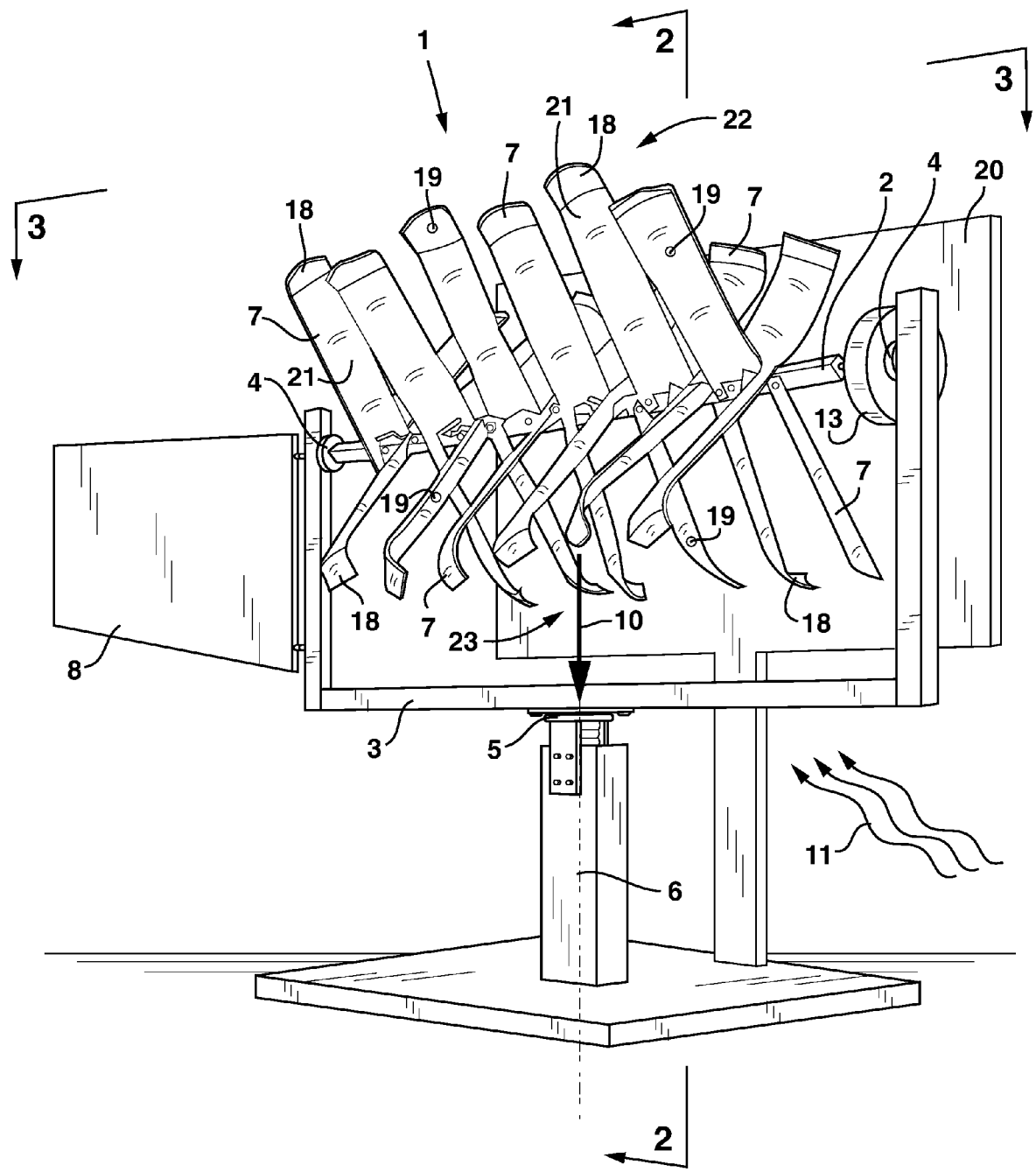
FIG. 1 is a perspective view of the wind driven turbine.
Figure 2:
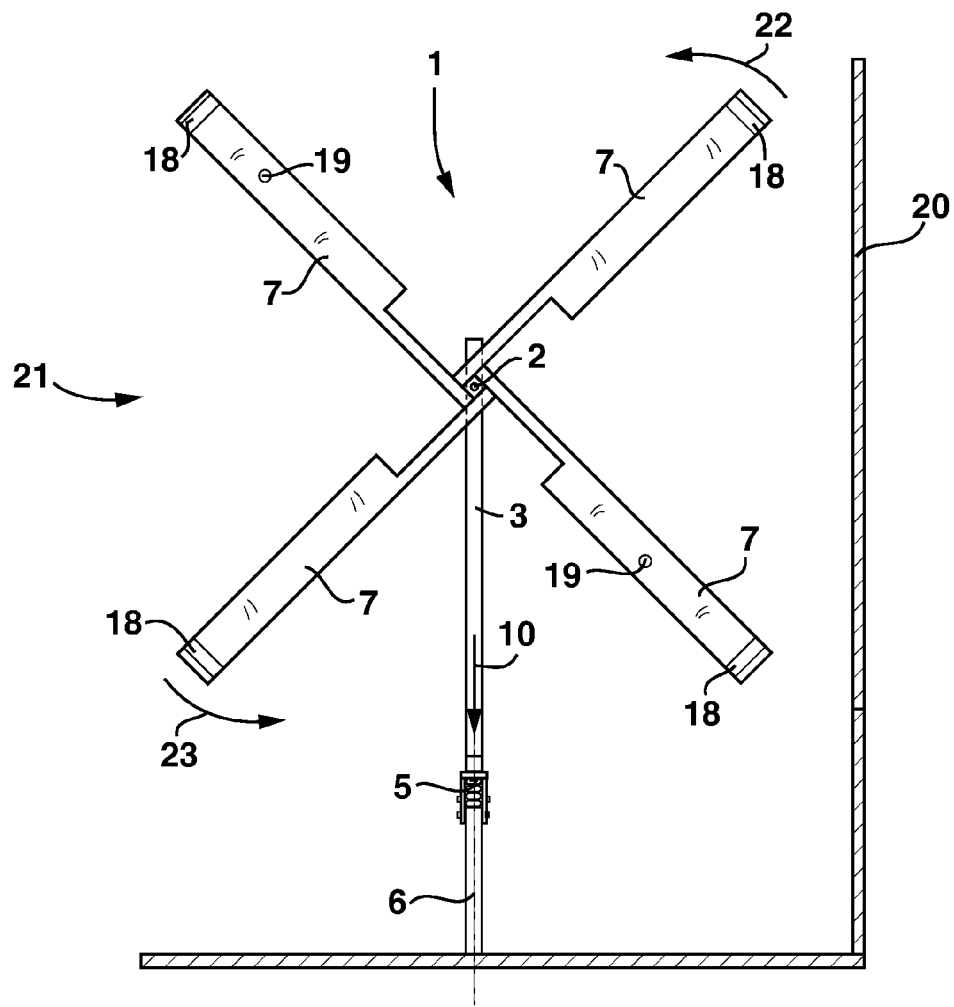
FIG. 2 is a section view of the wind drive turbine as shown in FIG. 1.
Figure 3:
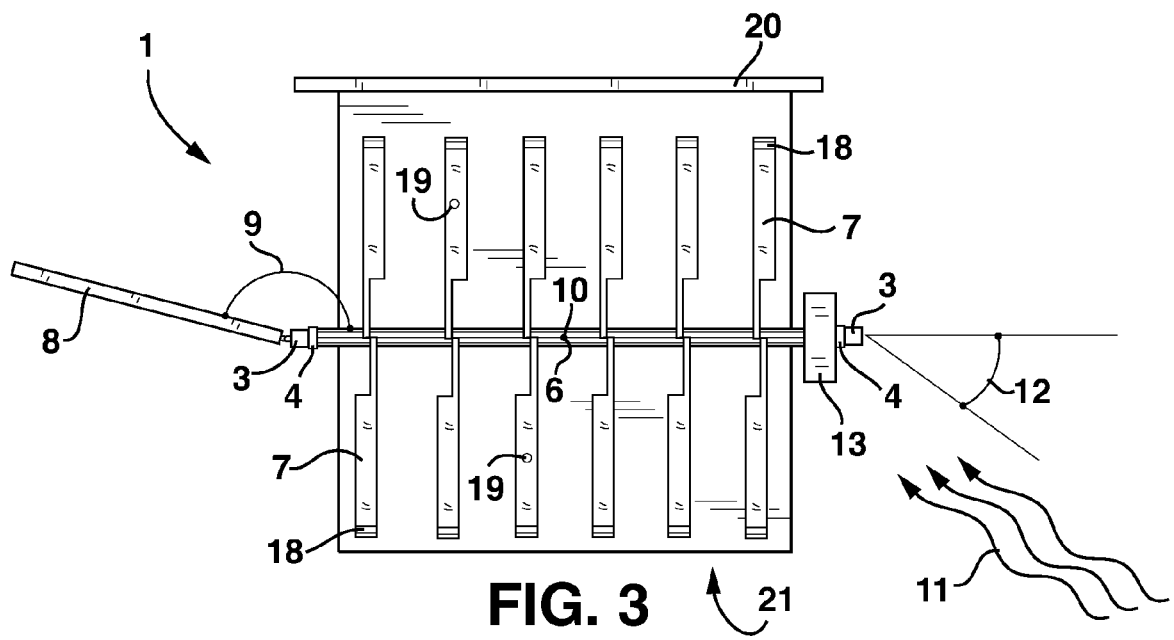
FIG. 3 is a section view of the wind driven turbine as shown in FIG. 1.

The wind-driven turbine apparatus 1 for collecting and using wind energy is an apparatus comprising: a horizontal axle 2; a support frame 3, said support frame 3 comprising; a plurality of bearings 4 configured to support said horizontal axle 2; and a central bearing 5 to permit said support frame 3 to rotate about a vertical axis 6; a plurality of axial blades 7, spaced longitudinally along said horizontal axle 2, spaced radially around said horizontal axle 2 in a manner to establish balanced rotation, and disposed along said horizontal axle 2 between said plurality of bearings 4; and a tail 8 attached to said support frame 3, and set at an angle 9 to said horizontal axle 2.

The horizontal axle 2 is rotatably mounted by said plurality of bearings 4 to the support frame 3. The support frame 3 is provided with a central bearing 5 located along a vertical axis 6 with the vertical axis 6 running approximately through the center of gravity 10 of the wind-driven turbine apparatus 1 to facilitate rotation of the wind-driven turbine apparatus 1 about the approximately vertical axis 6 so that the wind-driven turbine apparatus 1 is easily oriented by an incident wind 11 so that the incident wind 11 imparts maximum lift as it crosses the axial blades 7. The angle of incidence 12 between the incident wind 11 and the blades 7 is important in determining the amount of force developed by the blades 7 and therefore by the horizontal axle 2 as it the blade 7 and horizontal axle 2 assembly rotates. The angle 9 of the tail 8 relative to the support frame 3 is selected to cause the support frame 3 to rotate about the approximately vertical axis 6 so that the angle of incidence 12 of the incident wind 11 relative to the horizontal axle 2 as optimal as possible over all anticipated wind conditions.

When the incident wind 11 imparts lift as it crosses the axial blades 7 the lift causes the blade 7 and horizontal axle 2 assembly to rotate. Suitable energy conversion means 13 may be attached to the horizontal axle 2 to convert the energy of rotation into mechanical or electrical form for whatever use the user may make of the energy. Such energy conversion means 13 include, but are not limited to electrical generators 14, cranks 15, pumps 16 and spools 17. The blades 7 of the wind-driven turbine apparatus 1 may be curved with one or more of the blades 7 having a hooked tip 18.

Any number of blades 7 may be used provided that the blades 7 are positioned to produce a balanced rotation. It should be noted that balanced rotation may be achieved through the use of counterweights 19 and remain within the conception of this invention. The blades 7 may be positioned axially and longitudinally along the horizontal axle 2 so long as the result is a sufficiently balanced rotation to permit an incident wind 11 to produce rotation of the blades 7 and horizontal axle 2 assembly.

The tail 8 is set at an angle 9, relative to said horizontal axle 2, said angle 9 is chosen to permit incident wind 11 to cause the support frame 3 to rotate about the vertical axis 6 to optimize the wind angle of incidence 12 relative to the blades 7, thereby maximizing the lift produced by the incident 11 wind as it passes over said blades 7. The support frame 3 may further comprise a foil 20 mounted to the windward side 21 of the blade 7 and horizontal axle 2 assembly. Said foil 20 may serve to block the incident wind 11 from impeding the blades 7 as they move toward the incident wind 11. Said foil 20 may be designed to cause the incident wind 11 to deflect onto the leeward moving 22 blades 7. It will be understood that the foil 20 may serve to deflect the incident wind 11 onto the leeward moving 22 blades 7 as well as block the incident wind 11 from the windward moving 23 blades 7.

I claim:

1. A wind-driven turbine apparatus for collecting and using wind energy comprising:
    a) a horizontal axle;
    b) a support frame, said support frame comprising; a plurality of bearings configured to support said horizontal axle; and a central bearing to permit said support frame to rotate about a vertical axis;
    c) a plurality of axial blades, spaced longitudinally along said axle, spaced radially around said axle in a manner to establish balanced rotation, and disposed along said axle between said bearings; and
    d) a tail attached to said support frame at an angle of less than 180 degrees to said horizontal axle, said angle residing a plane perpendicular to the plane containing said support frame and said horizontal axle, said plane containing said horizontal axle
    e) a foil.

2. The wind-driven turbine apparatus of claim 1 wherein the axial blades are curved with one or more of the blades having a hooked tip.

3. The wind-driven turbine apparatus of claim 1 wherein the angle at which said tail is set relative to said horizontal axle is chosen to permit wind incident to the turbine to cause the support frame to rotate about said vertical axis to optimize the wind angle of incidence relative to said blades, thereby maximizing the lift produced by the wind as it passes over said blades.

4. The wind-driven turbine apparatus of claim 3 wherein the axial blades are curved, with one or more of the blades having a hooked tip.

\* \* \* \* \*